(12) United States Patent
Blok (10) Patent No.: US 7,597,056 B2
(45) Date of Patent: Oct. 6, 2009

(54) FLUID DISTRIBUTION METHOD AND APPARATUS

(76) Inventor: David Blok, 687 Beard Rd., Lynden, WA (US) 98264

( * ) Notice: Subject to any disclaimer, the term of this patent is extended or adjusted under 35 U.S.C. 154(b) by 223 days.

(21) Appl. No.: 11/382,225

(22) Filed: May 8, 2006

(65) Prior Publication Data

US 2007/0256617 A1 Nov. 8, 2007

(51) Int. Cl.
*A01C 23/00* (2006.01)
(52) U.S. Cl. .................. 111/121; 111/122; 111/128
(58) Field of Classification Search ......... 111/118–121, 111/128
See application file for complete search history.

(56) References Cited

U.S. PATENT DOCUMENTS

| | | |
|---|---|---|
| 2,628,628 A | 2/1953 | Hertz |
| 2,876,718 A | 3/1959 | Vaughan |
| 2,975,735 A | 3/1961 | Purvance |
| 3,145,735 A | 8/1964 | Osrow et al. |
| 4,649,955 A | 3/1987 | Otto et al. |
| 4,677,921 A | 7/1987 | Brown |
| 5,107,895 A | 4/1992 | Pattison et al. |
| 5,353,724 A | 10/1994 | Wheeley |
| 5,746,251 A | 5/1998 | Bullard |
| 5,769,169 A | 6/1998 | Miksitz |
| 6,758,152 B2 | 7/2004 | Steadman |
| 6,874,436 B2 | 4/2005 | Ranno et al. |

*Primary Examiner*—Christopher J. Novosad
(74) *Attorney, Agent, or Firm*—Michael F. Hughes; Hughes Law Firm, PLLC (57) ABSTRACT

A liquid manure distribution system where the manure is directed to an interior conduit within a distribution assembly or an outer rotating cylindrical member with tines attached thereto, creating crevice-like openings in the earth or a field and an internal timing member provides a slot for distribution of liquid manure at timed intervals when the slot is in positional alignment with the fluid passage openings as they are positioned downwardly adjacent to the formed crevice-like opening within the field.

11 Claims, 7 Drawing Sheets

FLUID DISTRIBUTION METHOD AND APPARATUS

BACKGROUND OF THE INVENTION

In agricultural applications, it is desirable to distribute liquid nutrient into a field and more particularly into the inner layer of earth below the root layer where the stalones and rhizomes are present. One preferred form of a liquid nutrient is liquid manure which often times is pooled into a liquid manure pond where the nutrients from the liquid manure are distributed onto a field.

There been various mechanisms for distributing liquid manure onto a field and as described further herein below, many of these mechanisms distribute manure through a plurality of lines and are gravity-fed behind a tine array, which partially digs up the ground and creates crevices therein.

As described herein, there is a new and improved apparatus and method for distributing liquid nutrients and more particularly liquid manure to a field by directly distributing the liquid manure to an internal conduit within a rotating tine assembly.

DETAILED DESCRIPTION OF THE PREFERRED EMBODIMENTS

Figure 1:
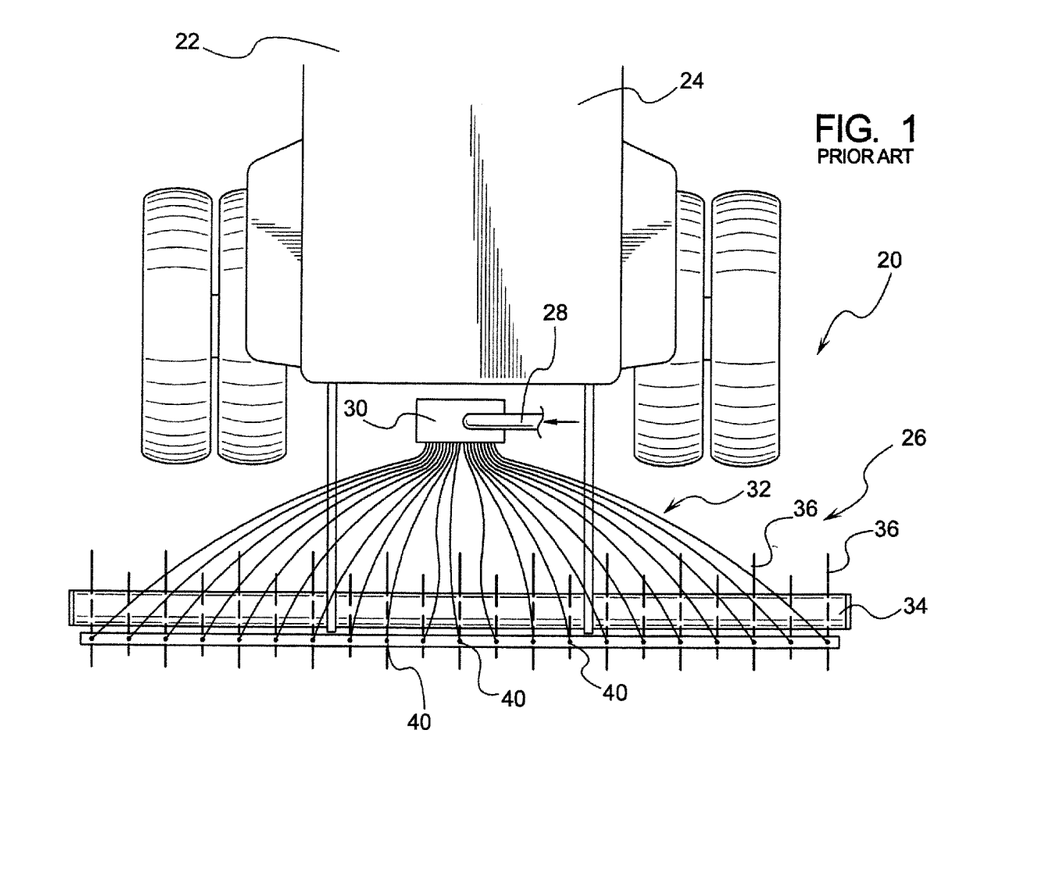
FIG. 1 discloses a top view schematically showing a prior art device where a tractor pulls a tine array where a plurality of feed conduits individually drop liquid manure behind the array of tines.

As shown in FIG. 1, there is a prior art system which is schematically shown to illustrate the basic operations of a prior art manure distribution device. In general, the system 20 generally has some sort of pulling device 22 such as a tractor or the like. Either on the tractor or part of the unit 26, there is a supply tank which can be at the location indicated at 24 or at any location in conjunction with the tractor or the unit 26. The supply tank 24 is in communication with the line 28 which directs liquid manure that is pumped to the manifold 30. The manifold 30 distributes liquid manure to the unit 26 by way of the plurality of feed conduits 32.

Basically, the unit 26 in form comprises a rotating member 34 having a plurality of extensions or tines 36 that are adapted to engage the earth and in particular, a field that needs to be fertilized. The tine 36 comprises tine arrays where the plurality of tines are circumferentially positioned around the rotating member 34 and rigidly attached thereto. A distribution bar 38 is positioned behind the tines and as the tine creates openings within the earth, the outlet portions 40 drop the manure from behind the rotating member 34.

Figure 2:
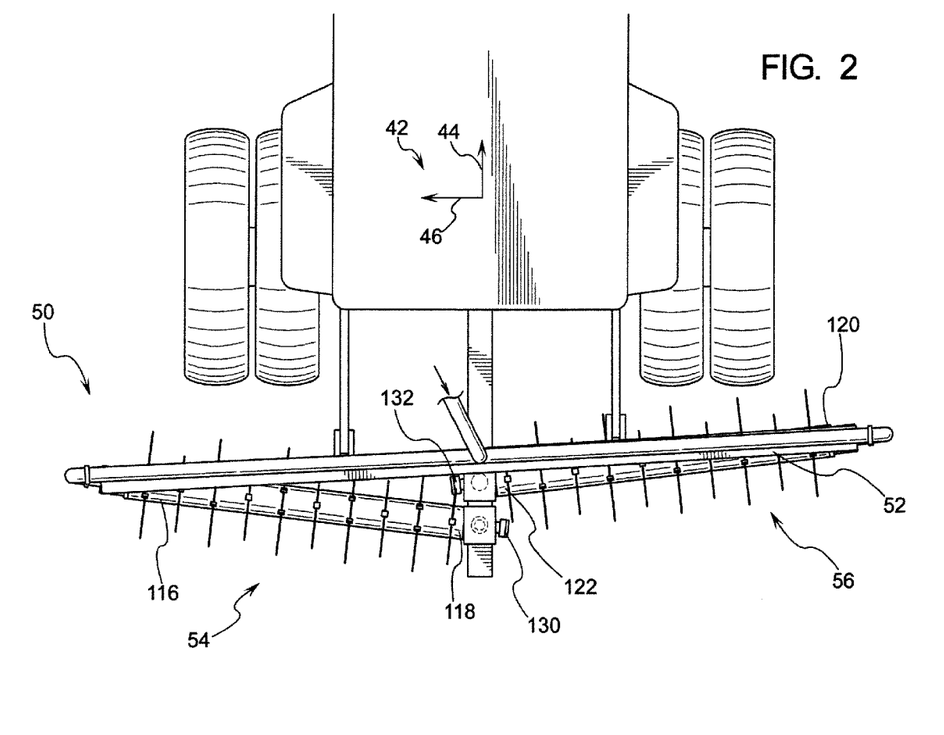
FIG. 2 shows a top view of one embodiment of the disclosure of a liquid manure distribution system positioned behind a pulling device such as a tractor.
Figure 3:
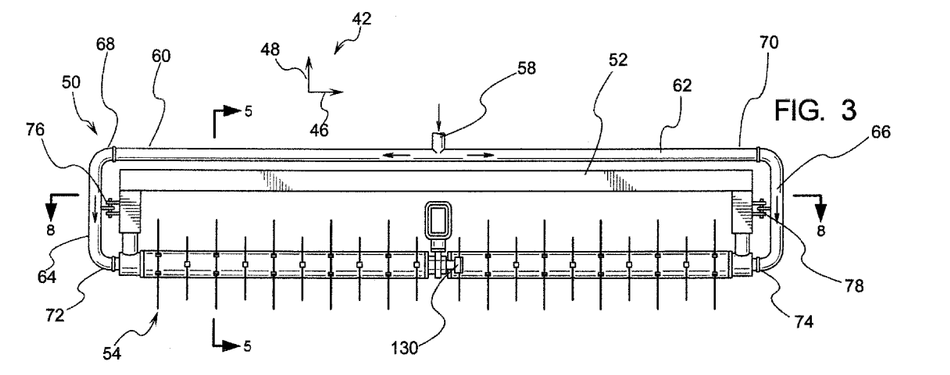
FIG. 3 discloses a rear elevation view of the liquid manure distribution system schematically showing the distribution of liquid manure to the left and right distribution assemblies.

With the foregoing description in mind, there will now be a discussion of a preferred embodiment of this disclosure with initial reference to FIG. 2. To aid in description of the preferred embodiment, an axes system is defined where as shown in FIG. 2, the axes system 42 comprises a longitudinal axis 44 as well as a lateral axis 46. As shown in FIG. 3, substantially orthogonal to the axes 44 and 46 is a vertical axis 48. The axis system is utilized for purposes of aiding in the general description and orientation of the components, and is not intended to limit the invention to any specific position or orientation such as exact orthogonal relationships between the directions described herein.

As shown in the top view in FIG. 2, the liquid manure distribution system 50 comprises a base frame 52, a distribution assembly 54 (the left or first distribution assembly), and another distribution assembly 56 which is further referred to as the second or right distribution assembly. In a preferred form, two distribution assemblies are utilized; however, in the broader scope, the operating principles can be executed with a single distribution assembly.

Referring now to FIG. 3, there is shown a rear elevational view of the liquid manure distribution system 50. As is further shown in this drawing, the liquid manure supply line 58 in one form passes through the left and right distribution lines 60 and 62. In general, the liquid manure distribution lines 60 and 62 have in one form end portions 64 and 66 that have a gasket fitting 68 and 70 in the upper portions and lower gasket fittings 72 and 74. The gasket fittings provide a certain amount of flexibility as the lateral distance from the end portions 64 and 66 are repositioned inwardly and outwardly as described further herein below. A conventional attachment mechanism 76 and 78 is adapted to properly position the end portions 64 and 66 and attach them to the base frame 52.

Figure 4:
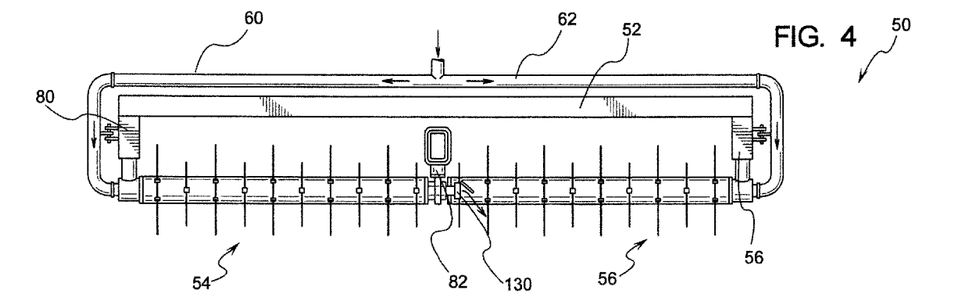
FIG. 4 shows the operation of a release valve that is adapted to allow the contents within the left distribution assembly's internal chamber to be released to the surrounding atmosphere.

The base frame 52 as shown now in FIG. 4 comprises first and second connection regions 80 and 82 which are further referred to as the left lateral outer and central connection regions. The base frame 52 further comprises a third connection region 84 otherwise referred to as the right lateral outer connection region.

Figure 5:
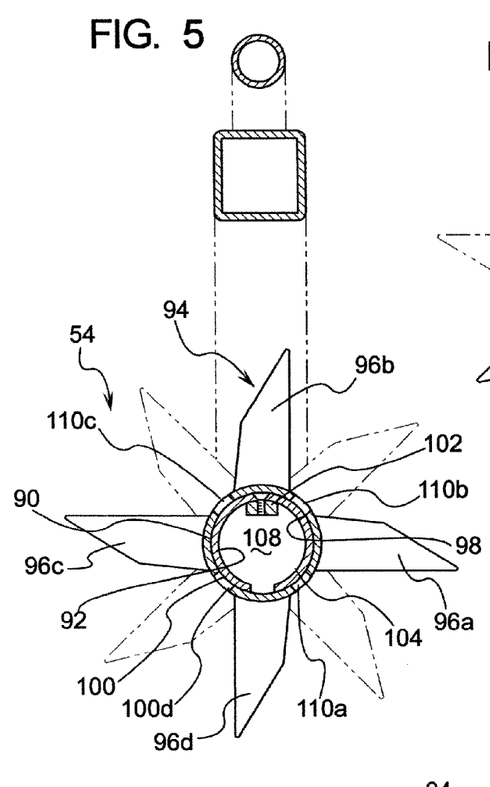
FIG. 5 shows a side cross-sectional view of the liquid manure distribution system showing a tine set comprised of four tines with four corresponding fluid passage openings.

There will now be a discussion of the first and second distribution assemblies 54 and 56 with initial reference to FIG. 5. As shown in FIG. 5, there is a cross-sectional view of one of the distribution assemblies (i.e. the first distribution assembly 54) and further showing in a cross-sectional manner the base frame 52 and the distribution line 60 which is adapted to have manure pass therethrough.

Figure 7:
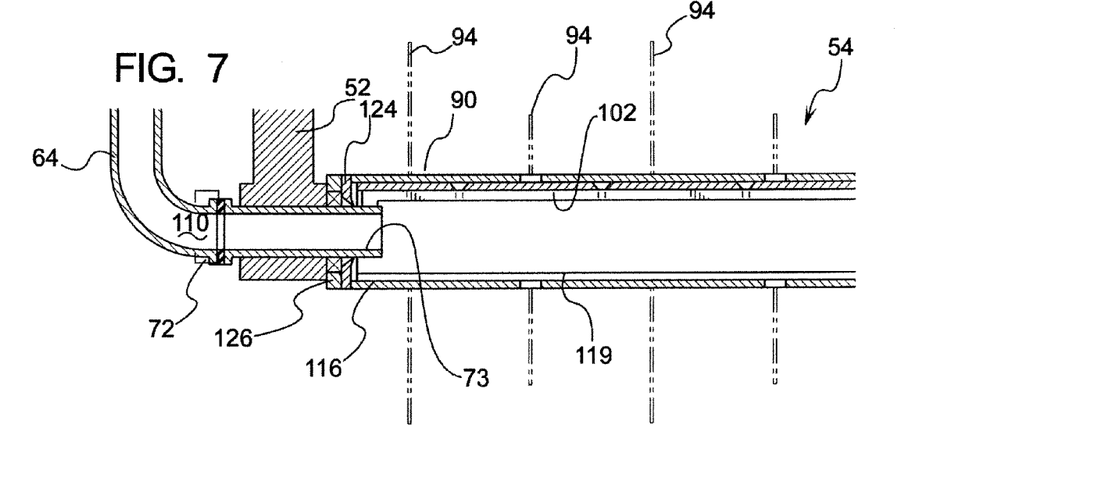
FIG. 7 shows a cross-sectional view in the corner region of the distribution assembly showing one form of an input nozzle for injecting the liquid manure into the inner chamber of the distribution assembly.

Now referring to the lower part of FIG. 5, the distribution assembly 54 in one form comprises a cylindrical member 90. It should be noted that the cylindrical member 90 need not be a perfect cylinder but as described herein should operate to rotate about an inner substantially static member such as the timing member 92 described further herein. The cylindrical member 92 comprises a plurality of tine sets 94 which as shown in one embodiment are comprised of four individual timing members indicated at 96A-96D. Of course any number of tine members can be utilized as well as any number of tine sets 94. Referring back to the cylindrical member 90, an inner surface 98 is adapted to engage the outer surface 100 of the timing member 92. The timing member in one form comprises a laterally extending bar 102 that is fastened to the inner cylindrical member 104, where as shown in FIG. 7, the lateral extending positioning bar 102 is effectively attached to the base frame 52 in one form by way of the input nozzle 73 which is in communication with the end portion 64.

Figure 6:
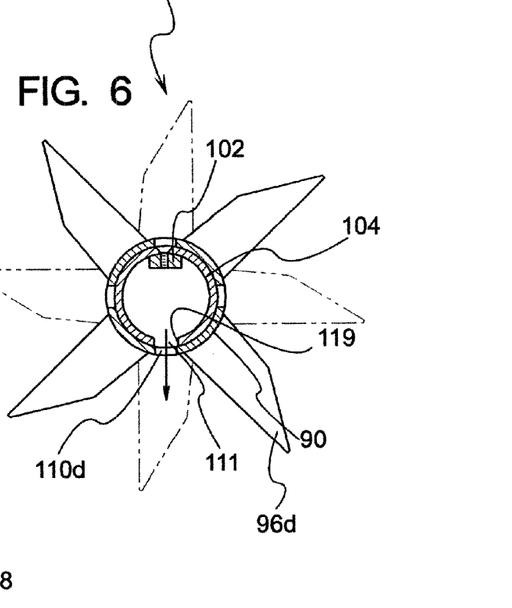
FIG. 6 shows a cross-sectional view of the distribution assembly showing the cylindrical member positioned around the timing member where the tines are rigidly attached to the cylindrical member.

Therefore, it can be appreciated that the timing member 92 remains substantially stationary with respect to the base frame 52. The timing member operates to provide an internal conduit 108 which in operation is filled with liquid manure or any other fertilizing substance to be distributed on to a field. As shown in FIG. 7, the internal chamber region 110 of the end piece 64 is in fluid communication with the chamber 108. As shown in FIG. 6, the timing member 92 comprises a surface 119 defining a laterally extending slot 111 which is adapted to correspond in location and desired intervals with the fluid passage openings 96A-96D. Of course the longitudinally extending slot 111 is defined broadly and need not be a continuous slot but rather could be parsed into individual sections as long as it operates as a timing slot to a correlating location at time intervals with the fluid passage opening of the cylindrical member 90.

Figure 11:
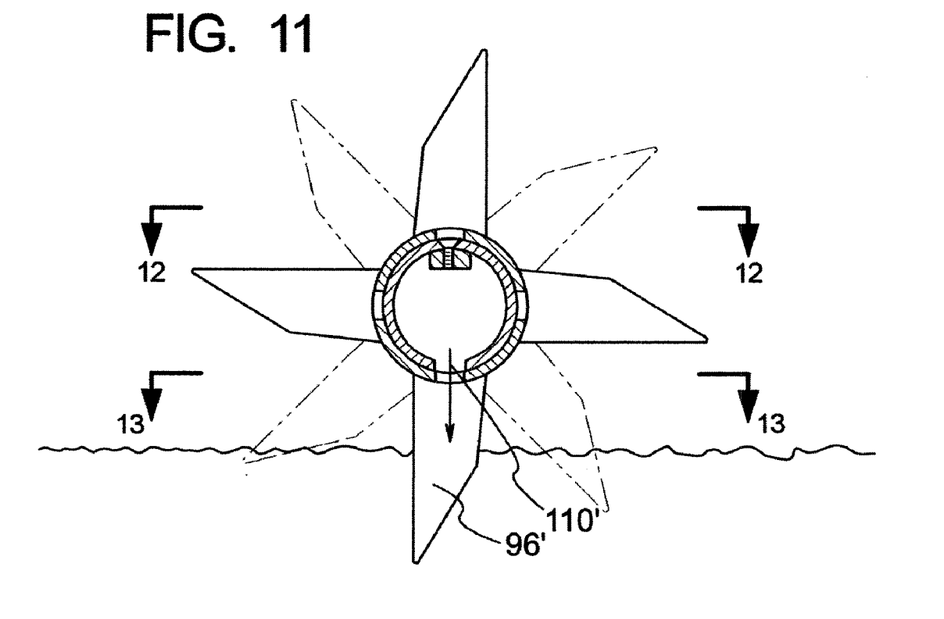
FIG. 11 shows a variation of the positioning of the fluid passage openings placed along the outer cylindrical member.
Figure 12:
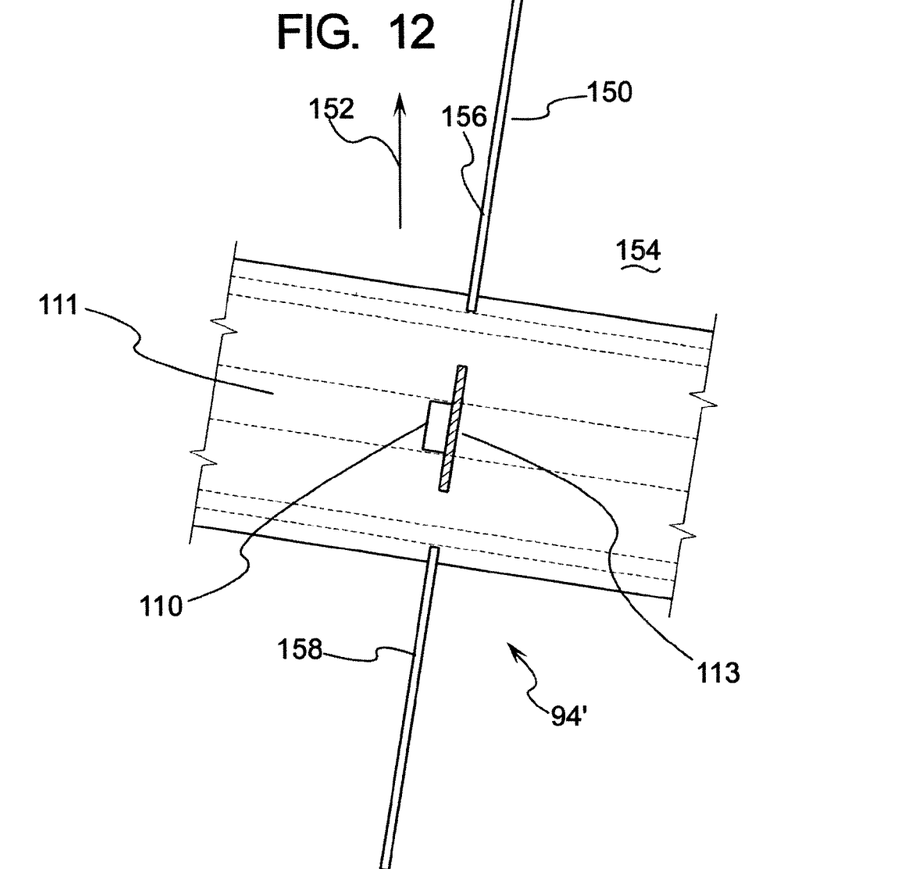
FIG. 12 shows a schematic view of the embodiment as shown in FIG. 11 where the tine path is positioned forward of the fluid passage openings with respect to the direction of travel.
Figure 13:
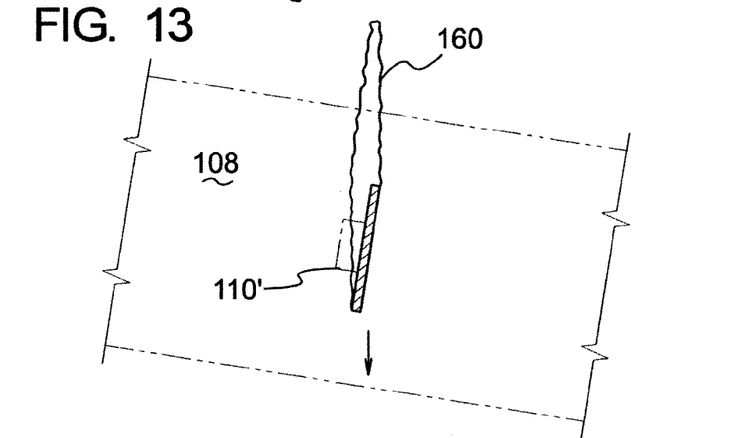
FIG. 13 schematically shows a crevice-like opening created by a tine where the fluid passage opening is positioned thereabove for distribution of the liquid manure.

Referring back to FIG. 5, a corresponding fluid passage opening 110A-110D is shown which is adjacent to a corresponding tine 96A-96D. The term "adjacent to" is defined broadly where, as immediately described below, any position of the fluid passage openings 110A-110D correlating with the position of a nearby tine which distributes liquid manure or another substance to a field by way of the earth-like crevice created by the tine is considered adjacent to the tine. FIG. 11 shows an alternative embodiment where the fluid-like opening is positioned to disburse liquid manure directly above the crevice-like opening formed by a tine as illustrated in FIGS. 12-13 described herein. However, FIG. 5-FIG. 6 shows an embodiment where, for example, the tine 96D repositions rearwardly where it is in engagement in the earth from FIG. 5 to the position as shown in FIG. 6, a crevice-like opening which is created in the earth is exposed and there is essentially a port timing where the fluid passage opening 110D is in fluid communication with the laterally extending slot 111.

Figure 10:
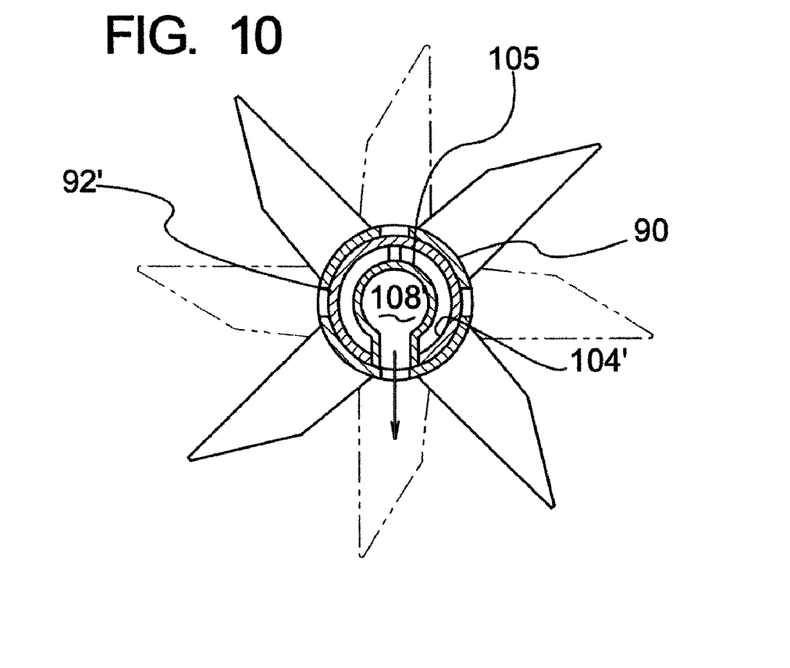
FIG. 10 shows a modified distribution assembly where the timing member has a slightly different configuration.

Of course it should be reiterated that the laterally extending slot could be a continuous slot extending the length of the distribution assembly 54 to the extent of the fluid passage openings of each tine set, or alternatively the slot 111 could be discreet and be essentially holes or perforations along the lower part of the inner cylindrical member 104 of the timing member 92 where each hole corresponds in location to a fluid passage opening at the lower portion of the distribution assembly 54. Of course, various modifications could be allowed where the laterally extending slot may be positioned slightly occasionally forwardly or rearwardly for a more desirable distribution of liquid manure. Referring ahead now to FIG. 10, there is shown another variation of the timing member 92' where an inner cylindrical member 104' is attached to an inner conduit member 105 which forms the internal conduit 108'. Of course, a variety of types of mechanisms can be utilized to form the timing member 92. In this variation as shown in FIG. 10, either of the members 104' or 105' may be more structurally rigid, or as described herein with the end bearing portions attached to the base frame 52, the internal conduit forming the timing member may be less structural and only have a primary operation of timing the ports (i.e. the laterally extending slot) with the fluid passage openings of the cylindrical member 90.

With the foregoing description in mind, there will now be a discussion of one method of connecting the cylindrical member 90 to be rotatably mounted. As shown in FIG. 7, the plurality of tine sets 94 are shown positioned along the cylindrical member 90. For purposes of overall general reference, as shown in FIG. 2, the distribution assembly 54 comprises a first or laterally outward connection portion 116 and a second or laterally inward connection portion 118. The second distribution assembly 56 further comprises a first or laterally outer connection portion 120 and a laterally inward or second connection portion 122. Now referring to FIG. 7, the first connection portion 116 is shown, where in one form, a seal-like member 124 is provided to provide a seal around the input nozzle 73. Further, a conventional bearing 126 is provided which allows the cylindrical member 90 to essentially be freely rotatably mounted to the base frame 52. Of course in a preferred form, the distribution assembly 54 is provided with free rotation where the tines, by nature of engaging the earth, rotate the assembly as crevice-like openings are formed. However, in other forms, there could be motorized torque applied to the cylindrical member 90.

Referring back to FIG. 2 and more particularly FIGS. 3 and 4, another feature of a preferred form of the main embodiment is shown whereby first and second release valves 130 and 132 are provided. Referring now to FIG. 3, it can be seen how the release valve (shown in a highly schematic nature at 130 in an elevational view in FIG. 3) is closed, which would be a normal operation of the first distribution assembly 54. However, when distributing a product such as liquid manure, which is generally pumped from the manure pond, various types of large materials can be found in the manure tanks. The applicants found that materials such as rags, or small pieces of wood, are on occasion not filtered out of the main liquid manure supply to be distributed on a field or other agricultural outlay of ground. Therefore, on occasion the internal conduit 108 (see FIG. 7) must be purged, whereby now referring to FIG. 4, the valve 130 opens and allows the contents contained within the chamber 108 as shown in FIG. 7 to be disbursed. This flushing generally allows a higher rate of flow which basically blows out any debris caught within the internal conduit/chamber 108.

Now referring to FIGS. 11-13, there is shown an alternative embodiment where the fluid passage opening indicated at 110' is positioned laterally next to (i.e. adjacent to) the tine 96'. As shown in FIG. 12, it can be seen in a more schematic nature that the tine set 94' defines a rotational tine path 150. In this form, it is apparent that the given direction of travel of the tractor or other their pulling device indicated at 152 in this form is not in parallel alignment with the tine path 150. This is referred to as an offset of the direction of travel. The tine path 150 at some portion of the rotational travel of the tine engages the field or earth generally shown at 154 at an approximate location somewhere in the largely forward region indicated at 156. Further, the tine disengages from the earth laterally outwardly and longitudinally rearwardly of some portion along the tine path, say for example at the location indicated at 158. Referring to FIG. 13, it can be seen that when the tine is at a lower position, a crevice-like opening 160 forms.

Therefore, it can be appreciated that as the laterally extending slot 111 corresponds in location to the fluid passage opening 110', fluid contained within the chamber 108 is disbursed downwardly into the crevice-like opening 160 as shown in FIG. 13. Therefore, in one form, the fluid passage opening 110' is "behind" the rotational path of the tine with respect to the direction of travel 152. Of course, in another form, the direction of travel could be opposite to that shown at 152 in which case the port would be positioned in the area indicated at 113.

Figure 8:
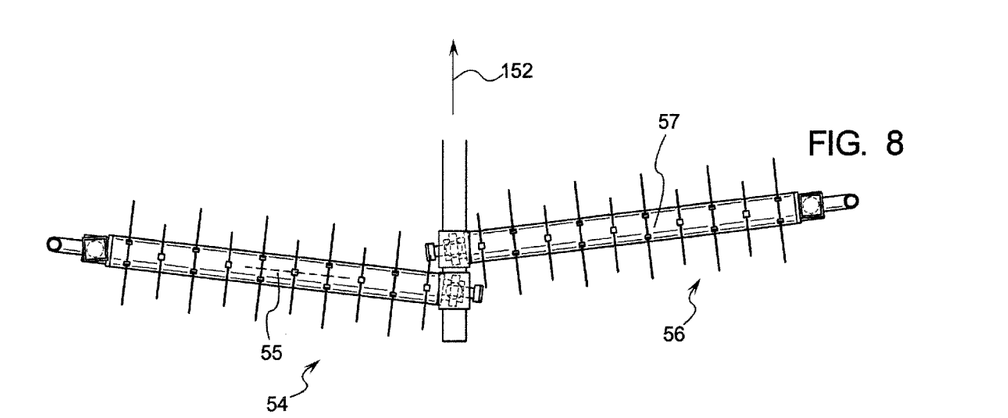
FIG. 8 shows a configuration of the left and right distribution assemblies where the path of rotational travel of the tine sets is slightly skewed from the direction of travel of the entire assembly.
Figure 9:
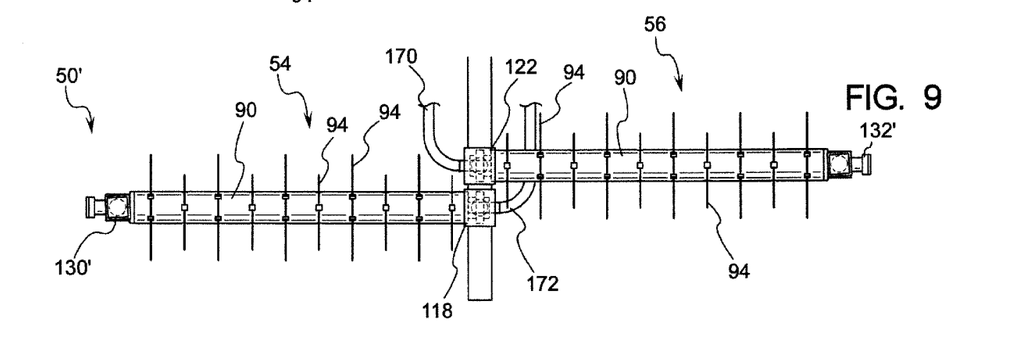
FIG. 9 shows another configuration of the left and right distribution assemblies that are substantially more in line with the path of travel to create less of a crevice like opening in the ground and there is further shown a modified form of distributing the liquid manure into the left and right distribution assemblies.

Referring now to FIGS. 8 and 9, it can be appreciated how the first and second distribution assemblies 54 and 56 can be repositioned about a vertical axis where the first and second central axes 55 and 57 are not perpendicular to the direction of travel indicated at directional vector 152. As shown in FIG. 9, an alternative arrangement of the first and second distribution assemblies 54 and 56 is shown where the laterally inward attachment regions 118 and 122 are repositioned so the tine sets 94 have a path of travel that is more in alignment with the direction of travel of the distribution system 50. An arrangement such as that shown in FIG. 9 would create less of a crevice-like opening in the earth whereas an arrangement such as that shown in, for example, FIG. 8 would create a greater opening, where as described above with reference to FIGS. 12 and 13, the path of travel of the tine has a laterally outward component as it is in engagement with the ground to create the opening. Such an arrangement will be more conducive for moist ground which can be repositioned more easily.

FIG. 9 shows also another embodiment where the input lines 170 and 172 merely show another arrangement where liquid manure can be introduced into the central chamber of the first and second distribution assemblies 54 and 56 from the laterally inward orientation. Of course, liquid manure could be injected in a variety of other formats such as somewhere along the cylindrical member 90 by way of a sealed rotational insert-type member. As also shown in FIG. 9, the first and second release valves 130' and 132' are positioned now at the laterally outward locations.

The amount of flow through the unit can be between 400-1000 gpm. A flow rate of 600 gpm +/−100 gpm is a one preferred range and a very broad range 200-1600 gmp could be feasible.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicant's general concept.

Therefore I claim:

1. A liquid manure distribution system adapted to disperse liquid manure into the earth from a liquid manure supply line, the liquid manure distribution system comprising:

a. a base frame having first and second connection regions, b. a tine assembly having a cylindrical member with a plurality of tine sets laterally spaced along the cylindrical member, each tine sent comprising a plurality of tines radially positioned around the cylindrical member rigidly attached to the cylindrical member where a fluid passage opening is positioned adjacent to a tine, the tine assembly having first and second connection portions rotatably connected to the first and second connection regions of the base frame, the cylindrical member being the primary structural member to have at least a majority of a force load applied thereto by way of the tine members engaging the earth and the load of the base frame upon the cylindrical member at the first and second connection regions, the cylindrical member configured to rotate with respect to the base frame,    c. a timing member having an inner surface defining an internal conduit positioned within the cylindrical member, the internal conduit having a surface defining a laterally extending slot, the internal conduit being in communication with the liquid manure supply line where the laterally extending slot is in intermittent communication with the fluid passage openings where the timing member is substantially statically positioned within the cylindrical member to distribute liquid manure when the corresponding tine adjacent to the fluid passage opening is in engagement with the earth,    d. whereby the plurality of tines are operatively configured to create crevice openings where the fluid passage opening adjacent to each of the plurality of tines allows fluid to be discharged into the crevice opening produced by a tine engaging the earth.

2. The liquid manure distribution system as recited in claim 1 where the liquid manure supply line comprises a first distribution line that communicates with the internal conduit and the first connection portions of the tine assembly.

3. The liquid manure distribution system as recited in claim 2 comprising a second tine assembly having first and second connection portions connected to a third connection region and the second connection region of the base frame.

4. The liquid manure distribution system as recited in claim 3 where said tine assembly and the second tine assembly are adapted to be repositioned such that a first central axis of the tine assembly and a second central axis of the second tine assembly are repositioned about a vertical axis with respect to a direction of travel of the liquid manure distribution system to provide a desirable crevice opening in the ground.

5. The liquid manure distribution system as recited in claim 4 where at least one of the plurality of fluid passage openings are positioned adjacent to a corresponding tine where the rotational tine path of a tine set is offset from the direction of travel and the corresponding fluid passage opening to a tine is positioned behind the rotational tine path to distribute liquid manure in the formed crevice opening.

6. The liquid manure distribution system as recited in 3 where the base frame comprises a central member where said tine assembly and the second tine assembly are movably positioned along the central member of the base frame to adjust the offset of rotational tine pass of each of the plurality of tine sets with respect to the direction of travel of the liquid manure distribution system.

7. The liquid manure distribution system as recited in claim 1 where the internal conduit is in communication with the liquid manure supply line at the second connection portion.

8. The liquid manure distribution system as recited in claim 1 where the timing member comprises a laterally extending positioning bar that is rigidly connected to the base frame.

9. The liquid manure distribution system as recited in claim 8 where the laterally extending positioning bar is attached to an input nozzle positioned at the first connection portion of the tine assembly where the input nozzle is in fluid communication with the liquid manure supply line.

10. The liquid manure distribution system as recited in claim 1 where the liquid manure supply line is in communication with the internal conduit of the timing member at the first connection portion of the tine assembly and a release valve is positioned near the second connection portion of the tine assembly to allow communication from the internal conduit to the ambient air for purposes of flushing out the internal conduit.

11. The liquid manure distribution system as recited in claim 1 where the liquid manure supply line is in communication with the second connection portion of the tine assembly and a release valve is positioned at the first connection portion of the tine assembly to allow the internal conduit to be flushed out.

* * * * *